Oct. 3, 1939.  E. R. POTTER  2,174,757
POWER DRIVEN LAWN MOWER
Filed Jan. 23, 1936  4 Sheets-Sheet 1

Oct. 3, 1939. E. R. POTTER 2,174,757
POWER DRIVEN LAWN MOWER
Filed Jan. 23, 1936 4 Sheets-Sheet 3
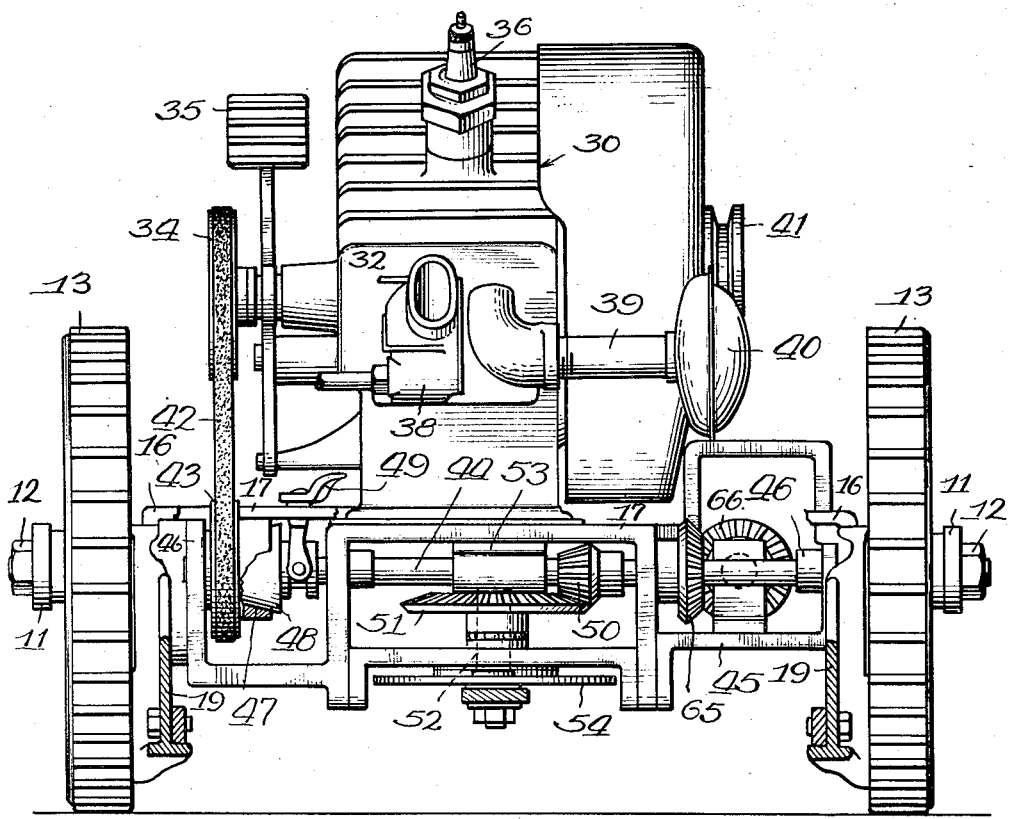
Fig. 3
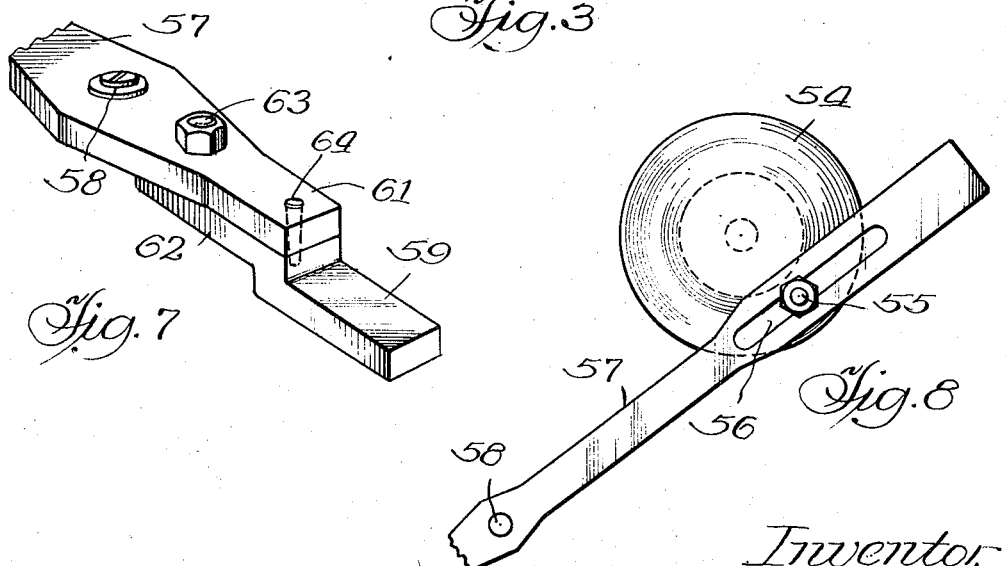
Fig. 7
Fig. 8
Witness:
Chas. R. Koursh.
Inventor,
Elbert R. Potter,
W. J. Fried, Atty

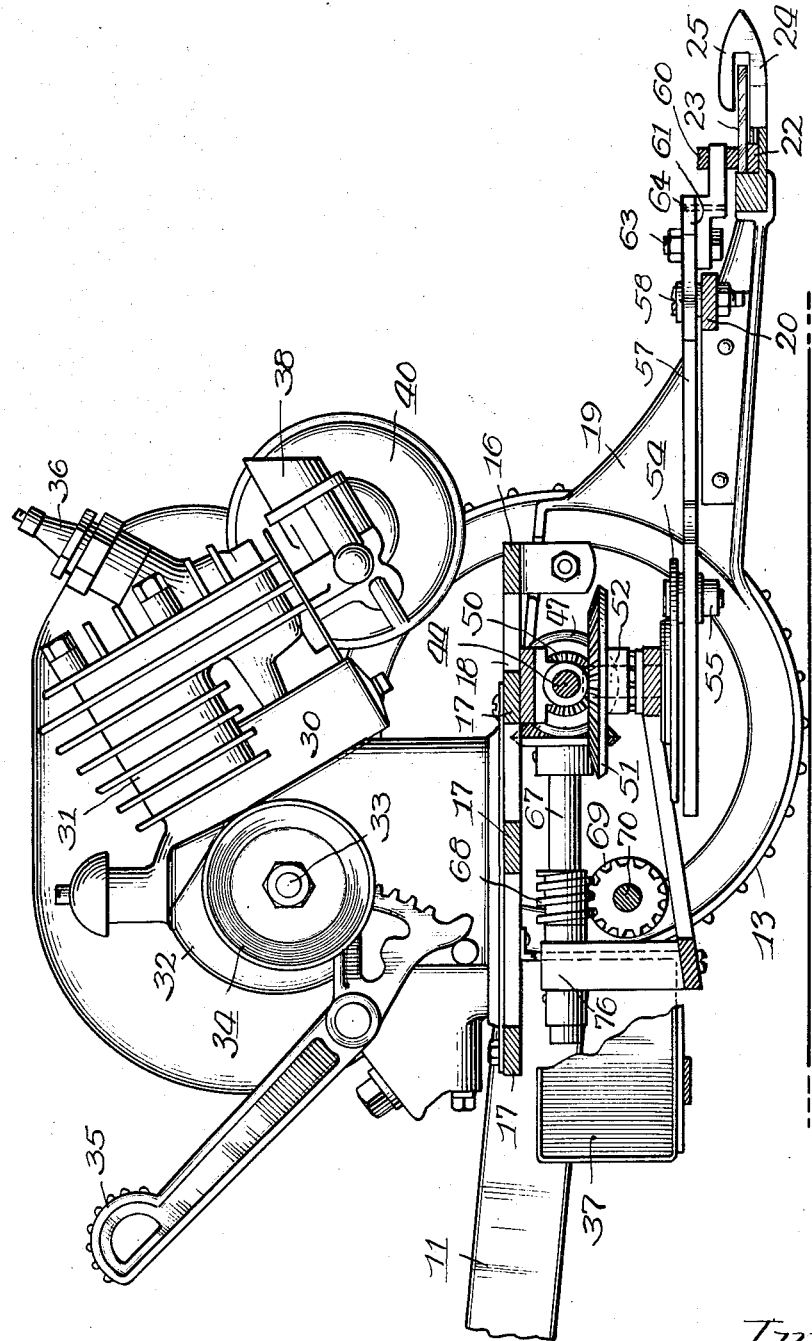

Patented Oct. 3, 1939

2,174,757

UNITED STATES PATENT OFFICE 2,174,757

POWER DRIVEN LAWN MOWER

Elbert R. Potter, Chicago, Ill., assignor, by mesne assignments, to Mohawk Equipment Corporation, a corporation of Illinois Application January 23, 1936, Serial No. 60,387

4 Claims. (Cl. 56—25)

My invention relates to a power driven lawn mower which employs reciprocating cutting mechanism and is designed not only for cutting grass but also weeds and all sorts of grain and is designed to facilitate cutting in small and irregular places and in recesses or under overhanging brush or bushes or ornamental devices, which may adorn a lawn.

The further object of the invention is to provide a mower of the type described which is propelled by a motor, which also drives the cutting mechanism at high speed and in such a manner as to efficiently cut grass, weeds, grain or the like, whether operated over comparatively large areas or small lawns and which in the latter instance may be so controlled by the operator in a convenient manner from the handle of the machine, that the latter may be manually moved backward or forward to place the cutting mechanism in proper relation to the ground to be cut, independently of the power drive, which when in operation not only serves to operate the cutting mechanism through a gear train, but also serves as a driving mechanism for the ground wheels for advancing the machine, thereby eliminating any necessity for manual tractive effort especially during the cutting operation, while also permitting the machine to be transported or pulled about from place to place free of the motor and the gear mechanism, thereby preventing undue harm on or injury to the latter.

Another object of the invention is to provide a neat, light and compact motor driven mower in which the motor is supported upon the wheeled frame of the machine to propel the latter through the ground wheels by a novel arrangement of gear train which can be connected or disconnected at will from the motor and also from the drive wheels so as to permit the latter to run free for manually moving the machine forward or backward, free of the drive mechanism to locate the cutting mechanism in proper relation to the growth to be cut or for transporting the machine from place to place without necessitating that it be lifted and placed bodily upon a conveyance; which embodies a novel drive connection between the gear transmission and the reciprocating bar of the cutting mechanism for driving the latter at high speed to secure efficient cutting action; which embodies means for operatively disconnecting the cutting mechanism from the drive mechanism in case of striking an obstruction which would tend to injure the cutting mechanism or blades thereof and to generally improve, simplify and enhance the value and efficiency of devices of this class.

With the above and other objects in view, the invention consists in certain novel structure and arrangement of parts to be hereinafter more particularly specified and pointed out in the claims.

In the accompanying drawings:

Figure 3 is a front elevation partly in vertical section.

Figure 4 is a longitudinal vertical section partly in elevation.

Figure 5 is a detailed transverse section showing the means for operatively connecting and disconnecting the ground wheels with the drive mechanism.

Figure 6 is a fragmentary perspective view of a form of cutter-bar with the parts disassembled.

Figure 7 is an enlarged fragmentary perspective view showing a safety connection between the driving mechanism and the moveable cutter-bar.

Figure 8 is a fragmentary plan view of the cutter-bar drive.

Figure 1:
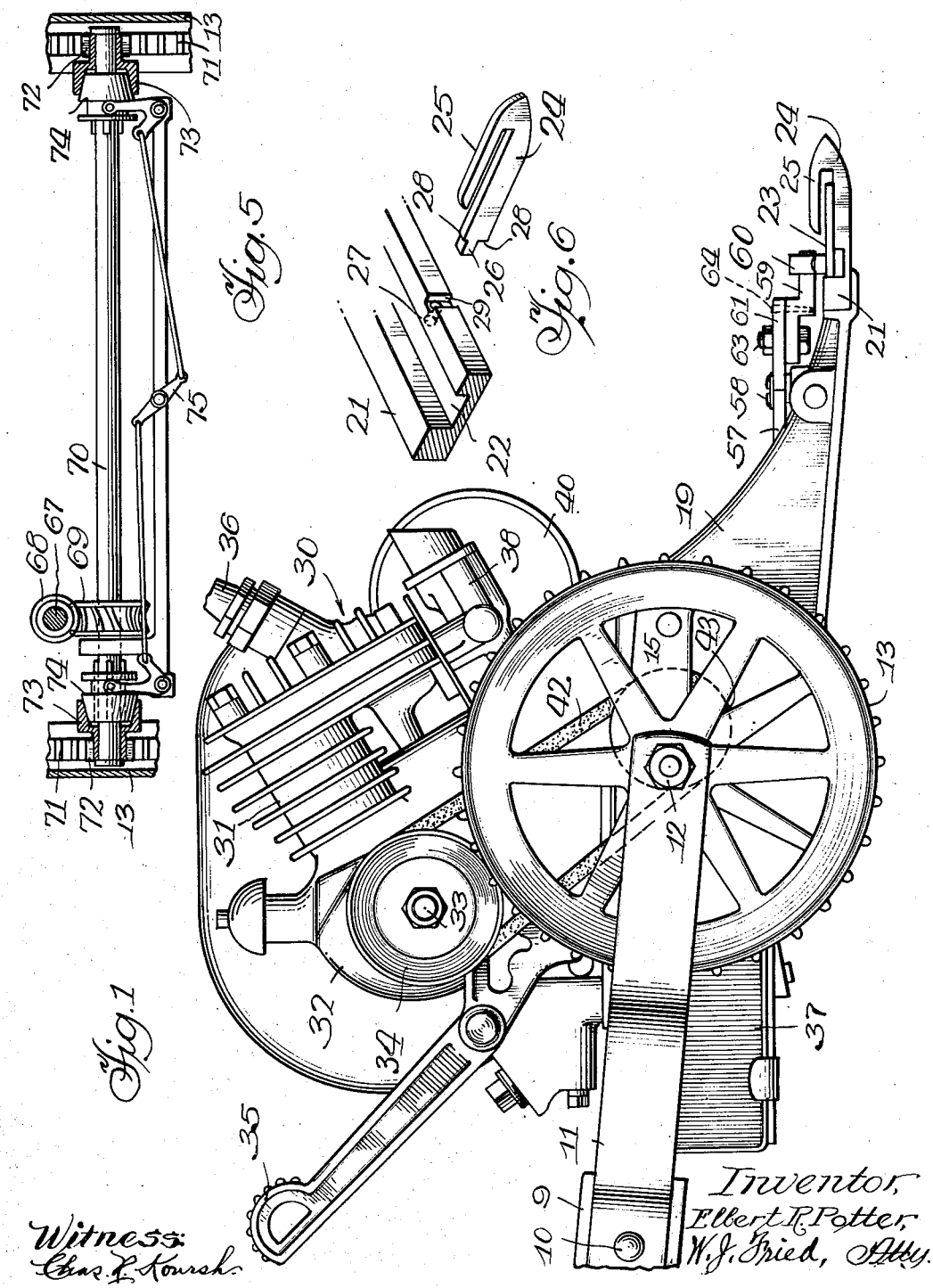
Figure 1 is a side elevation of a power driven lawn mower in accordance with the invention.
Figure 2:
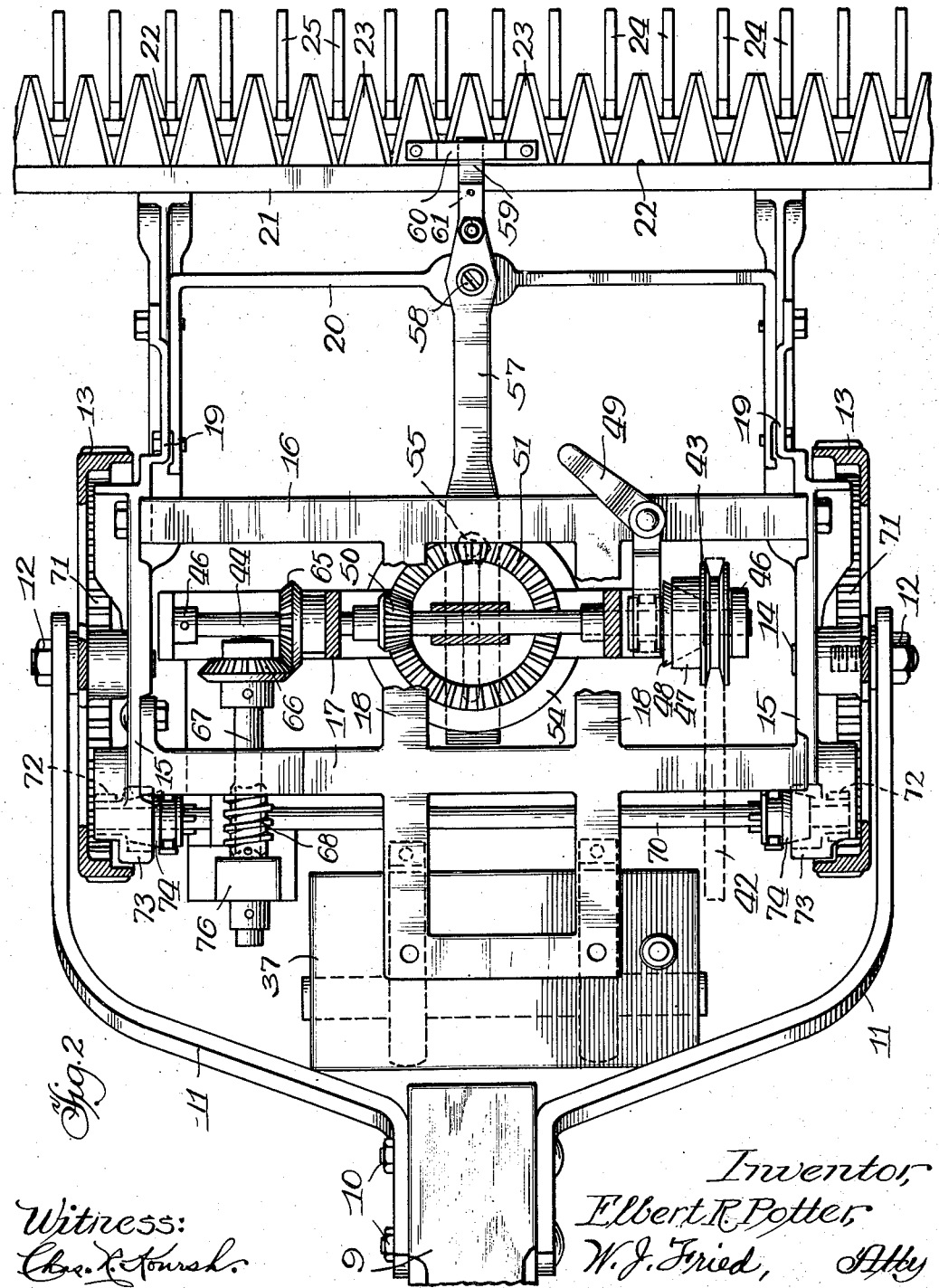
Figure 2 is a plan view partly in section.

Referring to the drawings in detail in which similar reference characters designate corresponding parts throughout the several views, and in which 9 designates the handle of the machine bolted at 10 to side members 11 of a yoke comprising a pair of straps pivotally connected at 12 to the hubs of ground wheels 13 journaled at 14 in the sides 15 of the frame of the machine. This frame may be of suitable construction but preferably consists of said side members connected by cross-members 16 and 17 forming a horizontal supporting structure or open frame work with connections 18 between said cross-members. The forward portions of the side members 15 are offset inwardly as indicated at 19 and connected by a cross brace 20. The forward ends of said side members serve to support a stationary cutter-bar 21 preferably constructed as shown particularly in Figure 6 with a longitudinal groove 22 in its upper face forming a guide-way for a moveable cutter blade 23, which has a series of teeth operating in fingers 24. These fingers are preferably blanked out of sheet metal with overhanging guards 25 and reduced polygonal ends 26 shown square and entering holes 27 drilled horizontally through the portion of the stationary cutter-bar 21 in front of the groove 22 while the shoulders 28 fit in vertical seats 29 cut in the front edge of bar 21 so that when the rear ends of the portions 26 are upset or riveted this will hold the fingers from turning.

A motor 30 is mounted upon the frame and is shown as a single cylinder air cooled internal combustion engine including cylinder 31, a crank case 32, a crank shaft 33, having a pulley 34 fixed to one end adapted to be started by the foot operated starting pedal 35. The motor is provided with an ignition means including a spark plug 36, a gasoline tank 37 connected to a carburetor 38 supplying gasoline to the cylinder while the discharge of waste gases takes place through the exhaust 39 bearing a muffler 40. The fly-wheel of the motor is designated as 41. These parts are more or less conventional but it is to be understood that any suitable type of internal combustion or other motor may be employed having any desired number of cylinders. An endless drive belt 42 is trained on the pulley 34 and also a pulley 43 loose on a transverse shaft 44 journaled in the upright ends of a transverse frame structure 45 suspended beneath the horizontal frame structure heretofore described through the medium of bearings 46. A cone clutch serves to operatively connect the pulley 43 with the shaft 44 and consists of a recessed member 47 engaged by a cone 48 splined on the shaft 44 to rotate therewith, and is shifted by a lever 49, which may be operated by foot or by hand from the handle 9 so as to operatively connect or disconnect the motor and shaft of the driving mechanism at will. The shaft 44 carries a fixed pinion 50, which meshes with a larger horizontal gear 51 fixed to a vertical shaft 52 journaled in a bearing 53 supported by the intermediate frame structure and the lower end of the shaft 52 carries a horizontal disk 54 bearing a crank pin 55, which operates in a slot 56 of a lever 57 pivoted near its forward end as at 58 on the cross member 20 and having a downwardly offset forward end 59 engaged beneath a strip 60 attached to the moveable cutter-blade 23, which operates in the groove or guideway 22. The knives of the cutter-blade operate in the fingers 24. In order to provide a safety element between the drive mechanism and the cutting mechanism, the lever 57 is made in two sections and the forward end 61 over-lies the rear portion of a short section 62, which is pivotally connected at 63 at the rear end of section 62 and the forward end 61 and intermediate portion of section 62 are provided with registering vertical apertures receiving a soft or readily breakable pin 64, so that if the cutting mechanism should be clogged or obstructed by striking a hard object or obstruction, which would be likely to injure the cutting blades, the pin 64 is sheared to prevent further reciprocation of the moveable cutter-blade.

Also mounted on the shaft 44 near one or both ends is a bevel gear 65 meshing with a gear 66 fixed to a longitudinal shaft 67 journaled horizontally in the frame structure. This shaft 67 bears a worm 68 meshing with a worm gear 69 shown in Figure 4 fixed to a transverse shaft 70 journaled in the frame structure. The ends of the shaft 70 extended within the rims of the ground wheels 13, which are formed with internal gears 71 and the ends of the shaft 70 bear pinions 72, which are loose thereon and have recessed clutch members 73 and adapted to be engaged by cones 74 splined on the shaft 70 and shifted by a lever mechanism 75 from the handle 9 or otherwise so that the shaft 70 can be operatively connected to or disconnected from the ground wheels 13 for driving the latter to propel the machine when in operation or to render the wheels 13 free so that the machine can be manually pushed forward or backward free of the driving mechanism or gear train to adjust the cutter-blade to the ground to be cut, especially in irregular places or beneath overhanging brush or ornaments adorning a lawn. This is also facilitated due to the frame being offset inwardly at the front immediately in back of the cutting mechanism, and the cutter mechanism projecting outwardly therefrom at each side. End thrust of the shaft 67 is taken up by a bearing 76. The gear ratio between the bevel pinion or gear 50 and gear 51, is such that the cutting mechanism is reciprocated at relatively high speed and by proper adjustment of the moveable and stationary cutter-bars, as well as the blades with respect to the fingers, this will insure efficient cutting action.

The operation of the machine, assuming that the motor is operating, by throwing in the clutch element or cone 48 to engage the element 47 while the latter is driven with its pulley 43 through the belt 42 and pulley 34 from the motor shaft 33, rotation will be imparted to the shaft 44. Through the gears 50 and 51, rotation will be imparted to the shaft 52, which in turn will drive the crank disk 54 which acts as a flywheel, at the desired speed reduced below that of the speed of the motor. As the disk 54 is rotated, the lever 57 will be oscillated to reciprocate the moveable cutter-blade for cutting grass, weeds, grain or other growth.

During the cutting operation the machine is advanced by driving the ground wheels 13 and this is effected from the shaft 44 through the gears 65 and 66, which drives the worm shaft 67 and by reason of the worm 68 meshing with the worm gear 69, the shaft 70 is rotated. When the clutch elements 73 and 74 are engaged, rotation of the pinions 72 with the internal gears 71 of the wheels 13 will drive the latter and advance the machine. However, when it is desired to move the machine forward or backward free of the power drive and the gear mechanism, the clutch elements 74 are disengaged from the clutch elements 73 to permit the wheels 13 to run free. This is also for the purpose of permitting the machine to be transported from place to place without placing the machine upon a conveyance or necessitating the lifting thereof.

While I have shown and described my invention in a preferred form, I am aware that various modifications and changes may be made therein without departing from the principles of the invention, the scope of which may be determined by reference to the appended claims. However, by employing the crank disk 54 and lever 57 for operating the cutter-bar and by reason of the leverage obtained due to the relation of the lever arms of the lever 57 in front and in rear of the pivot 58, a prime mover or motor of minimum horse power may be employed to advance the machine and operate the cutting mechanism. In practice, a one-half horse-power motor has been found ample. Also, the disk 54 keeps the lever 57 in proper position, so that the parts operate smoothly and without undue friction.

I claim as my invention:

1. In a mower of the class described, a reciprocating cutter mechanism, a frame supporting the same, a motor on the frame, gear mechanism immediately beneath the motor and frame, a lever pivotally supported beneath the frame and gear mechanism and adapted to be oscillated, said lever having operative connection with the cutter mechanism, said lever comprising pivoted sections, a readily breakable member connecting said sections and adapted to be sheared upon the cutting mechanism being obstructed in its operation to prevent injury to said cutting mechanism.

2. In a hand mower of the class described, a wheeled frame, a cutting mechanism at the forward end of the frame, a power device on the frame, a gear train between the power device and cutting mechanism, operative connections between the power device and gear train including a speed increasing gear, a crank disk and a pivoted lever mounted on the frame near its forward end and with its rear end slotted and connected to the crank disk pivotally and slidably connected at its forward end to the cutting mechanism, a clutch for operatively connecting and disconnecting the power device from the gear train, driving connections including a worm gear between the power device and the wheels and clutches for operatively connecting said drive connections and wheels for advancing the machine or for disconnecting the same whereby the wheels can run free to permit the mower to be manually moved forwardly or backwardly.

3. In a device of the class described, a cutter mechanism including a stationary cutter-bar having a guideway in the form of a top groove and having vertical seats in its front edge with apertures leading into the guideway, a moveable cutter blade operating in the guideway and fingers having reduced ends secured in the apertures and adjacent shoulders engaged in said seats to prevent turning of the fingers.

4. A mower, including a wheeled frame, a reciprocating cutting mechanism supported on the frame, a motor, a gearing driven thereby and having operative connection with the wheels, a disk driven from the gearing, and a lever pivoted to the disk and near its forward end on the frame, the forward end of the lever being offset downwardly and slidably connected to the cutting mechanism.

ELBERT R. POTTER.